Nov. 2, 1943.  J. L. AASLAND  2,333,080
CORN PICKER CONSTRUCTION
Filed June 30, 1942

Inventor:
John L. Aasland
By Paul O. Pippel
Atty.

Patented Nov. 2, 1943

2,333,080

UNITED STATES PATENT OFFICE 2,333,080

CORN PICKER CONSTRUCTION

John L. Aasland, Moline, Ill., assignor to International Harvester Company, a corporation of New Jersey Application June 30, 1942, Serial No. 449,107

8 Claims. (Cl. 56—104)

This invention relates to a corn picker construction. More specifically it relates to a construction which insures picking of ears from tall corn stalks.

It frequently happens that, when corn is picked from tall corn stalks, the upper portions of the stalks are considerably above the snapping rolls so that the stalks are broken before the upper ends are passed through the rolls. This results in a loss of ears which are attached to the broken portions of the stalks. The present invention has to do with overcoming this drawback.

It is an object of the present invention to provide an improved corn picker construction.

A further object is the provision of means upon a corn picker which will insure the satisfactory picking of corn from tall corn stalks. Other objects will appear from the disclosure.

According to the present invention, a bar is positioned considerably above the snapping rolls of the corn picker so as to extend generally along the rows but, in addition, to cross them so that the ends of tall corn stalks are bent to one side of the snapping rolls and thereby the ends of the stalks are enabled to pass through the snapping rolls with less danger of breaking of the stalks.

In the drawing—

Figure 3:
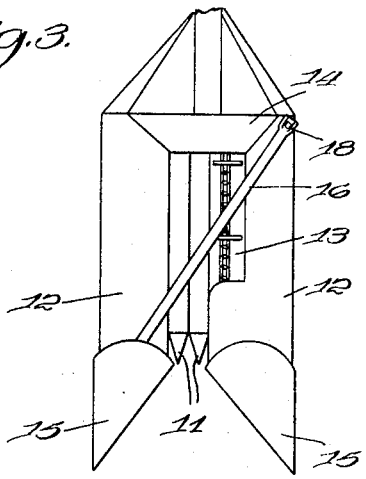
Figure 3 is a plan view of the corn picker, showing the novel bar attached thereto.
Figure 1:
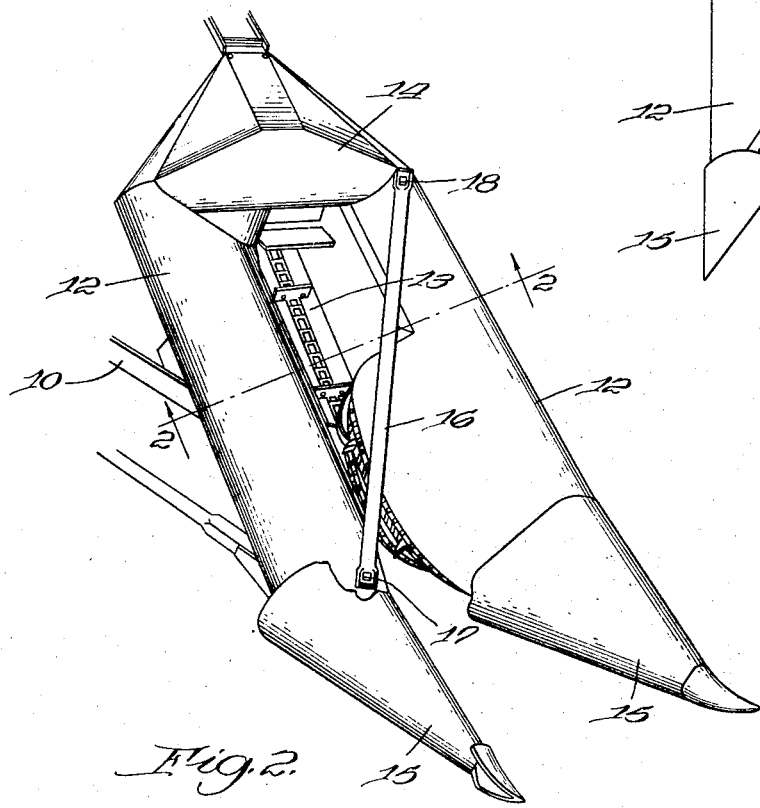
Figure 1 is a perspective view of a corn picker with the novel bar of the present invention attached thereto.
Figure 2:
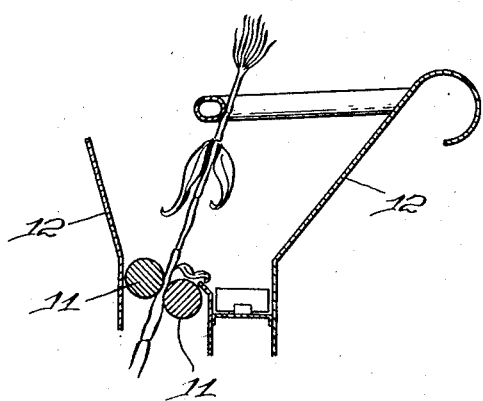
Figure 2 is a sectional view taken along the line 2—2 of Figure 1.

The corn picker shown in the drawing comprises a supporting means 10, a pair of snapping rolls 11 rotatably mounted upon the supporting means, shields 12 positioned at opposite sides of the snapping rolls and extending thereabove, and an ear elevator 13 extending along the upper portion of the rolls 11 at one side thereof. There is also a transverse shield 14 at the rear of the picker, through which the upper end of the elevator 13 extends. The picker also has gather points 15.

In operation the picker is moved through a field of corn so that a row of stalks passes in the space between the snapping rolls 11. The ears on the stalks are snapped or stripped from the stalks as the rolls in effect move up the stalks. Snapped ears drop upon the elevator 13 and are conveyed rearwardly.

It frequently happens that very tall, stiff corn stalks will reach the shield 14 before a considerable part of each stalk has passed through the rolls 11. Thus a considerable part of the stalks must be stripped of ears at the very upper end of the rolls, and the resultant overcrowding causes excessive shelling and frequently stopping of the entire snapping unit. This drawback is avoided by the novel means of the present invention, which will now be described.

The reference character 16 designates a bar or member in the form of a pipe bolted at its lower end, as indicated at 17, to the lower end of the shield 12 at one side of the snapping rolls 11 and bolted, as indicated at 18, to the upper end of the shield 12 at the other side of the snapping rolls 11. Thus the bar 16 is inclined in generally the same way that the snapping rolls are inclined and extends considerably above them and generally along them but is at an angle to them so that it crosses them. The upper end of the bar 16 is attached to the shield 12 at the side of the snapping rolls 11 at which the elevator 13 is located, so that the upper portion of the bar 16 extends over the elevator 13. The bar 16 bends the upper ends of the stalks to the right and over the elevator 13, as viewed in Figure 3, as the stalks pass through the corn picker. The result is that a considerable part of the stalks do not reach the shield 14 before being stripped, and there is not overcrowding at the upper end of the rolls. Since the stalks are bent toward the elevator, there is less tendency for pendant ears to come into contact with the rolls, and the shelling on this account is reduced.

It will be apparent from the foregoing description that a new and novel construction has been provided by which corn stalks may be satisfactorily passed through a corn picker for removal of the ears without danger of breakage of the upper ends of the stalks.

The intention is to limit the invention only within the scope of the appended claims.

What is claimed is:

1. In a corn picker, a supporting means, inclined snapping rolls, means rotatably mounting the snapping rolls thereon, an inclined bar extending generally along the snapping rolls at a considerable distance thereabove from one side of the rolls thereacross to the other side thereof for bending tall corn stalks to one side above the rolls to insure their passage between the rolls, and means mounting the inclined bar on the supporting means.

2. In a corn picker, a supporting means, inclined snapping rolls, means mounting the snapping rolls for rotation on the supporting means, shields extending along opposite sides of the rolls somewhat above the rolls, means mounting the shields on the supporting means, an inclined bar extending generally along the rolls and above the same from the lower end of the shield at one side of the rolls across the rolls to the upper end of the shield at the other side of the rolls, and means mounting the bar on the supporting means.

3. In a corn picker, a supporting means, inclined snapping rolls, means rotatably mounting the snapping rolls thereon, an elevator extending along an upper portion of the rolls at one side thereof, means mounting the elevator on the supporting means, an inclined bar extending generally along the snapping rolls at a considerable distance thereabove from an upper end at the side of the rolls at which the elevator is located across the rolls to a lower end at the other side of the rolls for bending tall corn stalks to one side above the rolls over the elevator to insure their passage between the rolls and the dropping upon the elevator of any ears dislodged by the bar, and means mounting the inclined bar on the supporting means.

4. In a corn picker, a supporting means, inclined snapping rolls, means mounting the snapping rolls for rotation on the supporting means, shields extending along opposite sides of the rolls somewhat above the rolls, means mounting the shields on the supporting means, an elevator extending along an upper portion of the rolls at one side thereof, means mounting the elevator on the supporting means, an inclined bar extending generally along the rolls and above the same from an upper end at the side of the rolls at which the elevator is located across the rolls to a lower end at the other side of the rolls for bending tall corn stalks to one side above the rolls over the elevator to insure their passage between the rolls and the dropping upon the elevator of any ears dislodged by the bar, and means mounting the inclined bar on the shields.

5. In a corn picker, a supporting means, ear-removing means providing an inclined space between them for the passage therebetween of corn stalks for the removal of ears therefrom, means mounting the ear-removing means on the supporting means, an inclined member extending generally along and above the space of the ear-removing means from one side of the space across the space to the other side of the space for bending tall corn stalks to one side of the space to insure their passage through the space, and means mounting the inclined member on the supporting means.

6. In a corn picker, a supporting means, ear-removing means providing an inclined space between them for the passage therebetween of corn stalks for the removal of ears therefrom, means mounting the ear-removing means on the supporting means, an elevator extending along one side of an upper portion of the space of the ear-removing means, means mounting the elevator on the supporting means, an inclined member extending generally along and above the space of the ear-removing means from an upper end at the side of the space at which the elevator is located across the space to a lower end at the other side of the space for bending tall corn stalks over the elevator to insure the passage of the stalks through the space and for the dropping upon the elevator of any ears dislodged by the member, and means mounting the inclined bar on the supporting means.

7. In a corn picker, a supporting means, ear-removing means providing an inclined space between them for the passage therebetween of corn stalks for the removal of ears therefrom, means mounting the ear-removing means on the supporting means, shields positioned at opposite sides of the ear-removing means somewhat thereabove, means mounting the shields on the supporting means, an inclined member extending generally along and above the space of the ear-removing means from the lower end of the shield at one side of the space to the upper end of the shield at the other side of the rolls, and means mounting the member on the shields.

8. In a corn picker, a supporting means, ear-removing means providing an inclined space between them for the passage therebetween of corn stalks for the removal of ears therefrom, means mounting the ear-removing means on the supporting means, means mounting the ear-removing means for rotation on the supporting means, shields extending along opposite sides of the ear-removing means somewhat thereabove, means mounting the shields on the supporting means, an elevator extending along an upper portion of the ear-removing means at one side thereof, means mounting the elevator on the supporting means, an inclined member extending generally along the space of the ear-removing means and above the same from an upper end at the side of the ear-removing means at which the elevator is located across the ear-removing means to a lower end at the other side of the ear-removing means, for bending tall corn stalks to one side above the ear-removing means over the elevator to insure passage of the stalks through the ear-removing means and dropping upon the elevator any ears dislodged by the member, and means mounting the inclined bar on the shields.

JOHN L. AASLAND.